US012355772B2

(12) United States Patent
Pierce

(10) Patent No.: US 12,355,772 B2
(45) Date of Patent: Jul. 8, 2025

(54) RESOURCE ACCESS CONTROL

(71) Applicant: Capital One Services, LLC, McLean, VA (US)

(72) Inventor: Brandee Pierce, South Pasadena, CA (US)

(73) Assignee: Capital One Services, LLC, McLean, VA (US)

( * ) Notice: Subject to any disclaimer, the term of this patent is extended or adjusted under 35 U.S.C. 154(b) by 496 days.

(21) Appl. No.: 17/807,574

(22) Filed: Jun. 17, 2022

(65) Prior Publication Data

US 2023/0412604 A1 Dec. 21, 2023

(51) Int. Cl.
*H04L 9/40* (2022.01)
*G06N 20/00* (2019.01)

(52) U.S. Cl.
CPC .......... *H04L 63/102* (2013.01); *G06N 20/00* (2019.01); *H04L 63/101* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,984,122 B2 | 4/2021 | Thomas | |
| 11,995,214 B2* | 5/2024 | Mosconi | G06F 21/121 |
| 2017/0046531 A1* | 2/2017 | Roberts | H04L 9/00 |
| 2019/0327271 A1* | 10/2019 | Saxena | H04L 41/16 |
| 2020/0076819 A1* | 3/2020 | Spurlock | G06F 21/10 |
| 2021/0174305 A1* | 6/2021 | Schornack | H04L 63/102 |
| 2021/0250362 A1* | 8/2021 | Spurlock | H04L 63/1416 |
| 2022/0147643 A1* | 5/2022 | Tran | H04L 41/22 |
| 2022/0366299 A1* | 11/2022 | Sinha | G06F 3/0484 |
| 2023/0315898 A1* | 10/2023 | Alaeddini | G06F 21/6245 726/28 |

\* cited by examiner

*Primary Examiner* — Joseph P Hirl
*Assistant Examiner* — Hassan Saadoun
(74) *Attorney, Agent, or Firm* — Harrity & Harrity, LLP

(57) ABSTRACT

In some implementations, a device may monitor user activity in a computing system. The device may detect, based on monitoring the user activity, modification of a resource of the computing system by a user. The device may determine, using a machine learning model and based on detecting the modification of the resource, a set of access rules for the resource based on one or more characteristics associated with the user and one or more characteristics associated with the resource. The device may control access to the resource based on the set of access rules.

20 Claims, 8 Drawing Sheets

RESOURCE ACCESS CONTROL

BACKGROUND

A file system may employ access permissions (or "user permissions") to control access to electronic resources, such as data files, directories, applications, or the like. Access permissions may also indicate a type of access that is permitted, such as read only (data may only be viewed) or read and write (data may be viewed or modified).

SUMMARY

Some implementations described herein relate to a system for resource access control. The system may include one or more memories and one or more processors communicatively coupled to the one or more memories. The system may be configured to monitor user activity in a computing system. The system may be configured to detect, based on monitoring the user activity, at least one of creation, modification, or sharing of a resource of the computing system by a user. The system may be configured to determine, using a machine learning model and based on detecting the at least one of creation, modification, or sharing of the resource, a set of access rules for the resource based on one or more characteristics associated with the user and one or more characteristics associated with the resource, where the one or more characteristics associated with the user include at least a role of the user, where the one or more characteristics associated with the resource include at least a content of the resource, and where the set of access rules indicate at least a set of users authorized to access the resource. The system may be configured to append the set of access rules to metadata of the resource. The system may be configured to determine, based on the metadata, that an attempt to access the resource violates the set of access rules. The system may be configured to transmit a notification to a user device associated with the attempt indicating that the attempt violates the set of access rules.

Some implementations described herein relate to a method of resource access control. The method may include monitoring, by a device, user activity in a computing system. The method may include detecting, by the device and based on monitoring the user activity, modification of a resource of the computing system by a user. The method may include determining, by the device using a machine learning model and based on detecting the modification of the resource, a set of access rules for the resource based on one or more characteristics associated with the user and one or more characteristics associated with the resource, where the one or more characteristics associated with the user include at least a role of the user, where the one or more characteristics associated with the resource include at least a content of the resource, and where the set of access rules indicate at least a set of users authorized to access the resource. The method may include identifying, by the device in the content of the resource, a reference to an additional resource of the computing system. The method may include determining, by the device, an additional set of access rules for the additional resource based on the set of access rules for the resource. The method may include controlling, by the device, access to the resource based on the set of access rules and to the additional resource based on the additional set of access rules.

Some implementations described herein relate to a non-transitory computer-readable medium that stores a set of instructions for resource access control for a device. The set of instructions, when executed by one or more processors of the device, may cause the device to monitor user activity in a computing system. The set of instructions, when executed by one or more processors of the device, may cause the device to detect, based on monitoring the user activity, at least one of creation, modification, or sharing of a resource of the computing system by a user. The set of instructions, when executed by one or more processors of the device, may cause the device to determine, using a machine learning model and based on detecting the at least one of creation, modification, or sharing of the resource, a set of access rules for the resource based on one or more characteristics associated with the user and one or more characteristics associated with the resource. The set of instructions, when executed by one or more processors of the device, may cause the device to control access to the resource based on the set of access rules.

DETAILED DESCRIPTION

Figure 1A:
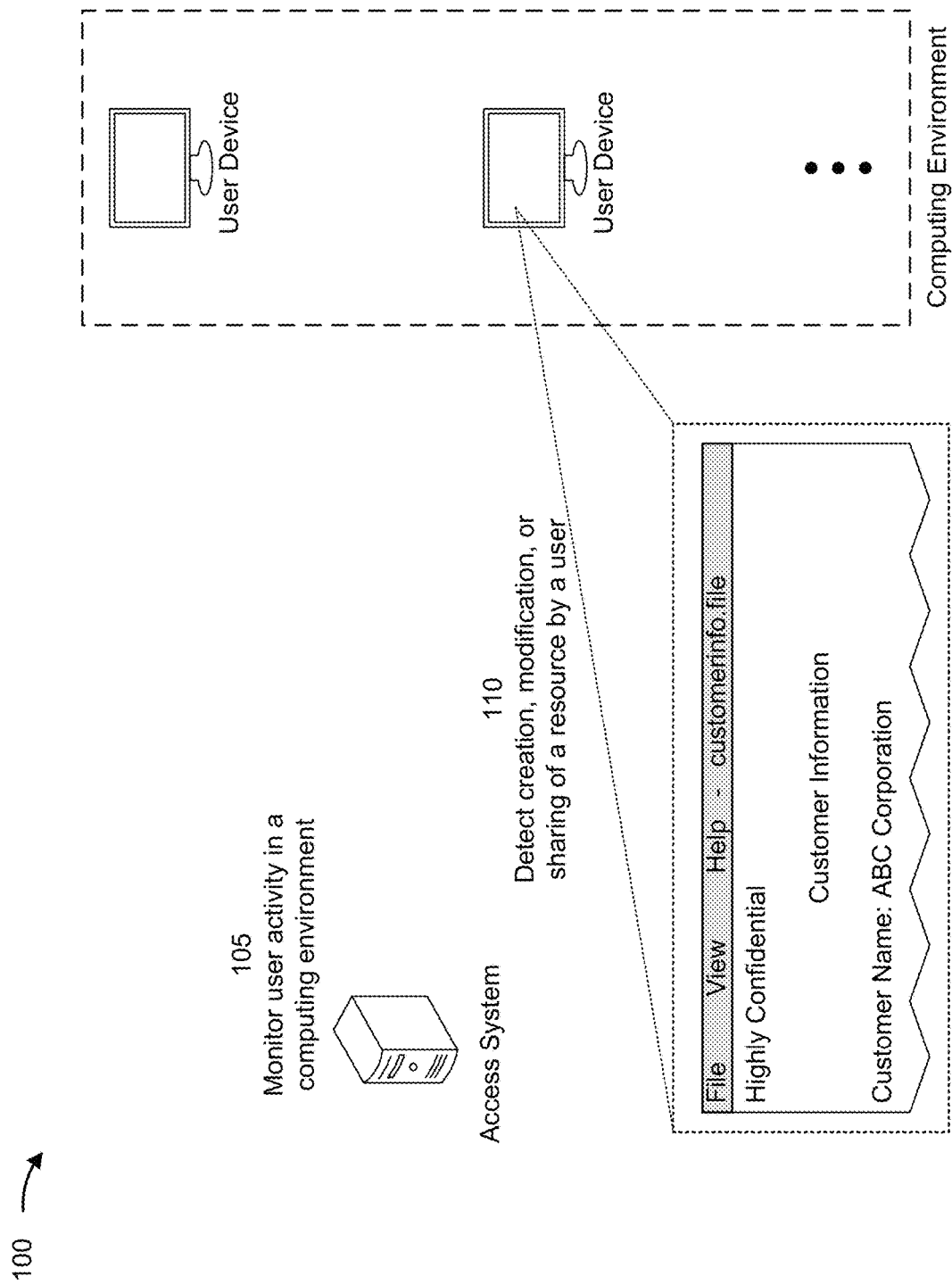
FIGS. 1A-1D are diagrams of an example implementation relating to resource access control, in accordance with some embodiments of the present disclosure.

The following detailed description of example implementations refers to the accompanying drawings. The same reference numbers in different drawings may identify the same or similar elements.

Users of a computing system of an entity may use user devices to access the entity's electronic resources, such as documents or file repositories. Generally, a user may access a resource pursuant to a legitimate purpose for the entity. However, sometimes, a user may access a resource for malicious purposes, such as exfiltration of sensitive information, corporate espionage, or the like. To combat such malicious activity, the entity may assign access permissions to a user to define a level or a type of access that is permitted for the user. However, typically, the access permissions are assigned manually. Accordingly, the access permissions may lack precision as well as fail to provide adequate computing security. In some cases, the access permissions may be overly restrictive. This may prevent the user from accessing a resource used for performing ordinary computing tasks such that significant computing resources may be consumed in connection with unsuccessful attempts to access the resource, attempts to circumvent access controls, identification of the overly restriction access permissions, and/or correction of the overly restrictive access permissions. In some other cases, the access permissions may be overly permissive. This may allow resources to be accessed for malicious purposes such that significant computing resources may be consumed in connection with monitoring for malicious activity, detecting malicious activity, remediating malicious activity, or the like.

Some implementations described herein provide an access system that uses machine learning to determine and assign a set of access rules for an electronic resource. The access system may monitor user activity to detect when a user creates, modifies, or shares the resource. The access system may generate or update the set of access rules for the resource each time the resource is created, modified, or shared. Additionally, the access system may generate or update the set of access rules based on dynamic data, such as existing permissions associated with the user, documents previously authored by the user, a work group or other user group associated with the user, the user's work responsibilities, and/or the user's communication history.

In this way, the set of access rules are dynamic and can be updated in real time or near-real time as the resource, or the use thereof, changes, thereby providing improved computing security. Moreover, the set of access rules have improved precision such that computing resources that would otherwise be expended as a result of overly restrictive or overly permissive access rules are conserved.

In some implementations, the access system may determine that an attempt to access a resource violates a set of access rules for the resource, and the access system may prevent the attempt and/or transmit a notification indicating that the attempt violates the set of rules. Accordingly, the access system may reduce malicious activity, thereby conserving computing resources that would otherwise be expended monitoring for, detecting, and remediating malicious activity. In some implementations, the access system may generate entries in a log that indicate a change to a set of access rules, a modification to a resource that caused the change, and/or an attempt to access a resource in violation of a set of access rules. Moreover, the access system may use machine learning to determine that the log is indicative of behavior associated with malicious activity, and the access system may perform one or more actions, such as causing privileges of user devices associated with the malicious activity to be revoked and/or transmitting a notification that alerts of the malicious activity. In this way, the access system may identify patterns associated with malicious activity to enable earlier prevention or termination of the malicious activity, thereby conserving computing resources that would otherwise be expended remediating malicious activity.

FIGS. 1A-1D are diagrams of an example 100 associated with resource access control. As shown in FIGS. 1A-1D, example 100 includes an access system, one or more user devices, one or more databases (e.g., a user database), a communications system, and a resources system. These devices are described in more detail in connection with FIGS. 3 and 4. The one or more user devices may be part of a computing system. For example, the computing system may be a cloud computing environment, a local area network, or another computer network. The computing system may be associated with an entity, such as an organization, a university, a government, or the like. Moreover, the computing system may be internal to the entity or otherwise private (e.g., accessible only by proper credentials). Thus, resources of the entity may be stored in, or accessed via, the computing system. The resources may include electronic documents (e.g., data files, such as word processing documents, spreadsheets, presentation documents, text documents, multimedia documents, image files, and/or video files, among other examples), electronic repositories (e.g., file directories, code repositories, and/or document repositories, among other examples), applications, and/or systems (e.g., scanning systems, printing systems, email systems, or the like) among other examples. Documents may include documents that are created, modified, and/or stored locally, in a cloud computing environment, via a web-based cloud service, and/or using a web-based application (e.g., a software as a service (SaaS) application), among other examples. Repositories may include repositories that are created, modified, and/or hosted locally, in a cloud computing environment, and/or via a web-based cloud service, among other examples.

As shown in FIG. 1A, and by reference number 105, the access system may monitor user activity in the computing system. For example, the access system may monitor for user activity relating to creation, modification, or sharing of a resource of the computing system. To monitor for the user activity, the access system may monitor applications (e.g., word processing applications, spreadsheet applications, or the like) executing in the computing system and/or systems implemented in the computing system (e.g., email systems, document retention systems, storage systems, or the like). For example, the access system may implement a background process in the computing system for monitoring user activity. In some implementations, the access system may include, may be included in, or may be integrated with an identity broker service, a directory service (e.g., an active directory service), a domain management service, a domain controller, and/or a configuration management database, among other examples, to facilitate monitoring of user activity.

As shown by reference number 110, based on monitoring the user activity, the access system may detect creation, modification, or sharing of a resource by a user. Creation of the resource may include creating a new document, opening a new document, saving a new document, creating a new repository, or the like. Modification of the resource may include editing a document, moving one or more documents into a repository, removing one or more documents from a repository, changing a document to cause an update of metadata of the document, or the like. Sharing the resource may include transmitting the resource or a link thereto, or preparing to transmit the resource (e.g., by attaching the resource or linking to the resource), using an email application, a chat application, a text message, or the like, and/or uploading the resource or preparing to upload the resource (e.g., to a website or to a storage location outside of the computing system). Creation, modification, and/or sharing of the resource may occur with a local application, a cloud-based application, and/or a web-based application, among other examples.

Detecting that the user is creating, modifying, and/or sharing the resource may cause (e.g., trigger) the access system to generate or update access rules for the resource. In other words, each time a resource is created, modified, and/or shared may trigger the access system to generate or update access rules for that resource. This generating or updating of the access rules may occur in real time (e.g., continuously, such as when the user is entering text into a document), periodically (e.g., at regular intervals, such as while a document is open or being edited), or upon the occurrence of an event. The event may be saving a document, closing a document, adding a document to a repository, removing a document from a repository, adding a recipient to an email to which the resource is attached, or the like.

Figure 1B:
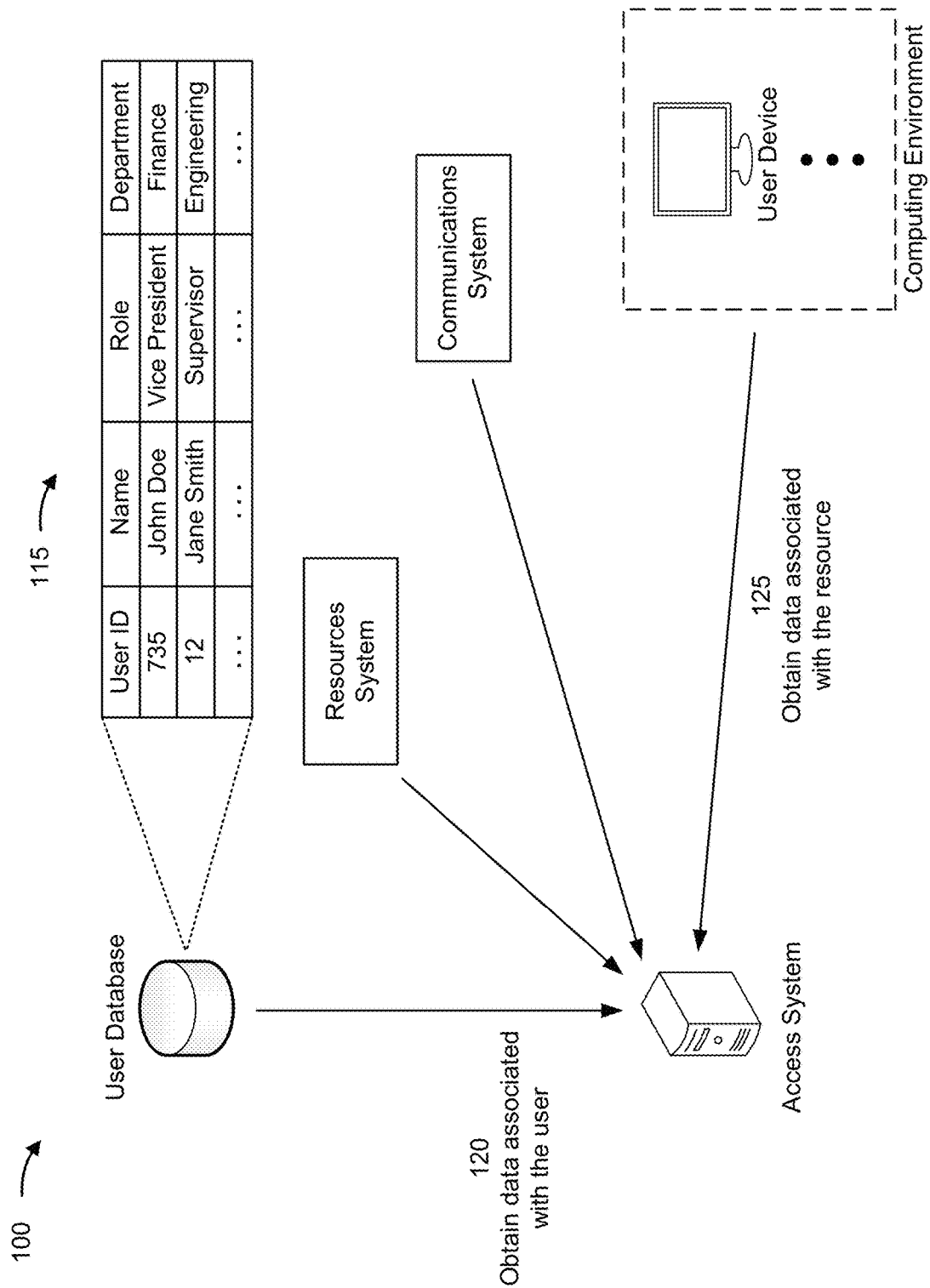

As shown in FIG. 1B, the user database may store user data 115. The user data 115 may include a plurality of entries respectively associated with a plurality of users (e.g., that engage in the user activity in the computing system). As shown, an entry of the user data 115 may include data associated with a user (e.g., the user associated with the creation, modification, or sharing of the resource). For example, the entry may identify an identifier for the user (e.g., an employee identifier), a name of the user, a role of the user (e.g., indicating a level of the user in a hierarchy of the entity and/or indicating work responsibilities of the user), and/or a department to which the user belongs (e.g., a department within the entity to which the user's primary work responsibilities relate), as shown. Additionally, or alternatively, the entry may identify a user group to which the user belongs (e.g., a team within a department) and/or a set of permissions for the user. For example, the set of permissions may identify systems, repositories, datasets, and/or applications, among other examples, that the user is authorized to read and/or write. The user data 115 may also facilitate identification of relationships between users (e.g., by indicating users that are in the same group or department or indicating supervisor/subordinate relationships between users).

The resources system shown in FIG. 1B may store resources (e.g., documents), or information relating to resources, that are stored in, or are accessible to, the computing system. For example, the resources may include documents previously created, modified, or shared by users. The information relating to the resources may indicate, for a resource, authors of the resource, editors of the resource, a location of the resource, an application used to create the resource, a file name of the resource, a keyword index of the resource, or the like. The communications system shown in FIG. 1B may store communications (e.g., emails or chat transcripts), or information relating to communications, that are transmitted and/or received in the computing system. For example, the communications may include emails previously sent or received by users. The information relating to the communications may indicate, for a communication, a sender of the communication, one or more recipients of the communication, a subject field of the communication, a keyword index of the communication, or the like.

As shown by reference number 120, based on detecting that the user is creating, modifying, and/or sharing the resource, the access system may obtain data associated with the user. For example, the access system may obtain the data from the user database, the resources system, and/or the communications system. In some implementations, the data may include data from an entry associated with the user in the user database. Additionally, or alternatively, the data may include one or more resources, or information relating thereto, that were previously created, modified, or shared by the user. Additionally, or alternatively, the data may include one or more communications, or information relating thereto, that were previously transmitted or received by the user.

Additionally, or alternatively, as shown by reference number 125, based on detecting that the user is creating, modifying, and/or sharing the resource, the access system may obtain data associated with the resource that the user created, modified, or shared. For example, the access system may obtain the data from the user device (e.g., from an application executing on the user device). In some implementations, the data may include a content of the resource (e.g., text content, in the case of a document, or a file listing, in the case of a repository), information indicating an application used to create the resource, information indicating an application used to modify the resource, information indicating an application used to share the resource, metadata of the resource, or the like.

Figure 1C:
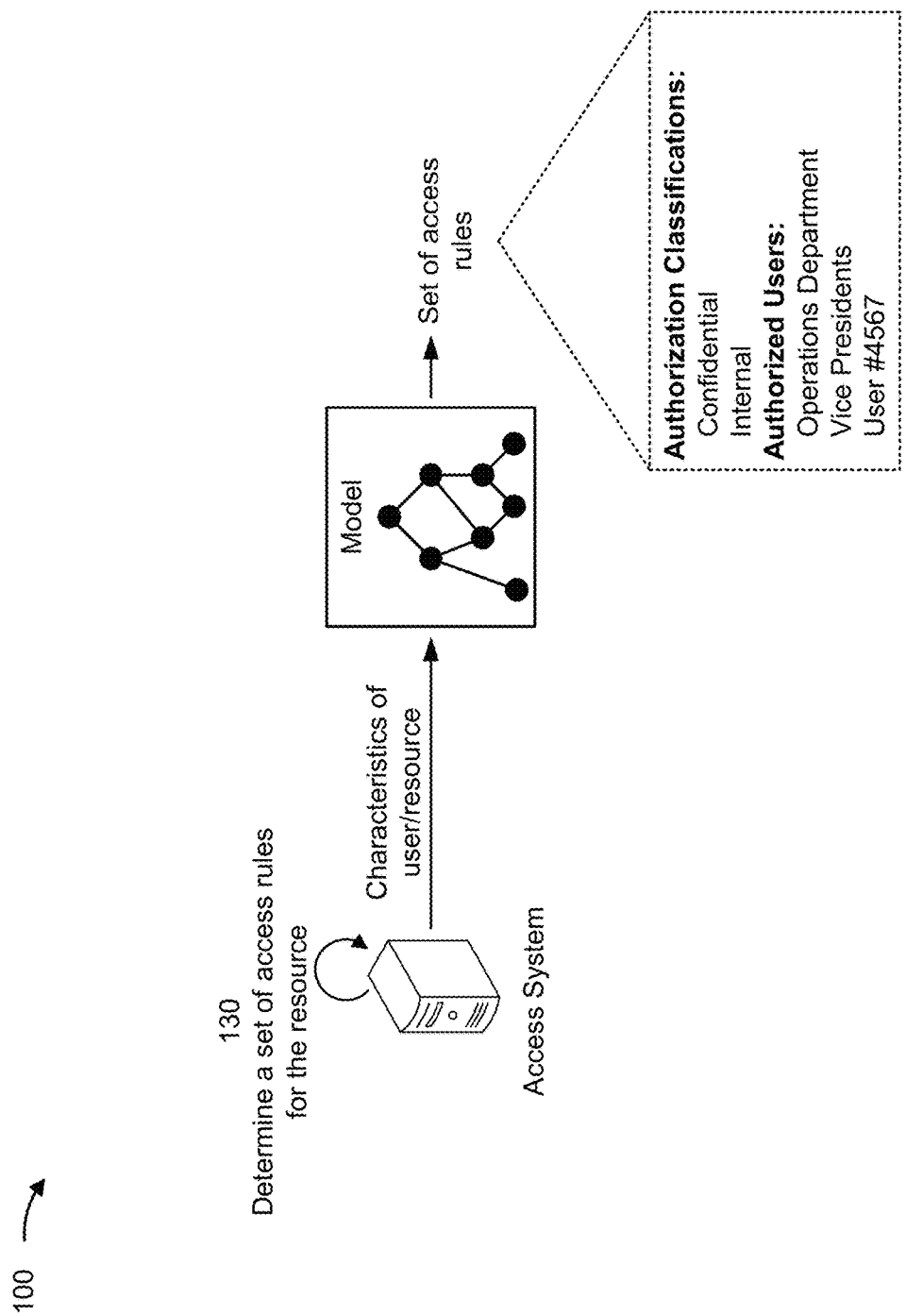

As shown in FIG. 1C, and by reference number 130, based on detecting that the user is creating, modifying, and/or sharing the resource, the access system may determine a set of access rules for the resource. The access rules may be determined based on one or more characteristics associated with the user and/or one or more characteristics associated with the resource. The characteristics associated with the user may be indicated by the data associated with the user (described in connection with reference number 120). The characteristics associated with the resource may be indicated by the data associated with the resource (described in connection with reference number 125).

In some implementations, the characteristics associated with the user may include at least a role of the user (e.g., indicating a level of the user in a hierarchy of the entity and/or indicating work responsibilities of the user). Additionally, or alternatively, the characteristics associated with the user may include a user group to which the user belongs (e.g., a team within a department), a department to which the user belongs, characteristics associated with one or more resources previously created, modified, or shared by the user (e.g., a content of those resources or keywords in those resources), one or more recipients with which the user previously shared one or more resources (e.g., by email, chat, or text message, among other examples), characteristics of communications received or transmitted by the user (e.g., recipients of those communications, senders of those communications, a content of those communications, or keywords in those communications), a user-defined and/or a system-defined sensitivity rubric (e.g., access rules and/or authorization classifications) associated with the user, and/or access permissions associated with the user, among other examples.

In some implementations, the characteristics associated with the resource may include at least a content of the resource (e.g., text content, in the case of a document, or a file listing, in the case of a repository). Additionally, or alternatively, the characteristics associated with the resource may include an application used to create, modify, or share the resource, a type of the resource (e.g., a presentation document or a code repository) a system that uses the resource (e.g., an email system or a document retention system), a location at which the resource resides (e.g., a file location of the resource), one or more recipients with which the resource is being shared, whether the user activity of the user was a creation, a modification, or a sharing of the resource, and/or a user-defined and/or a system-defined sensitivity rubric (e.g., access rules and/or authorization classifications) associated with the resource.

In some implementations, the access system may determine the set of access rules for the resource using a machine learning model. The machine learning model may be trained to output the set of rules for the resource based on the characteristics of the user and/or the characteristics of the resource, as described further in connection with FIG. 2. The set of access rules may indicate at least a set of users authorized to access the resource. For example, the set of access rules may indicate one or more departments of the entity authorized to access the resource, one or more roles (e.g., user roles) authorized to access the resource, one or more groups of users (e.g., one or more teams within one or more departments) authorized to access the resource, and/or one or more particular people (e.g., users) authorized to access the resource, among other examples. Additionally, or alternatively, the set of access rules may indicate one or more authorization classifications for the resource (e.g., confidential, non-confidential, internal only, internal and external, public, or the like).

As an example of how the machine learning model may determine the set of access rules, an input to the machine learning model may indicate that the user that created the resource is a vice president in an operations department and the resource is a presentation document with content that includes the text "customer information" and "highly confidential." Continuing with the example, the machine learning model may determine the set of access rules indicating that the resource is confidential and to be kept internal to the entity (e.g., because presentation documents generated by the operations department and marked as confidential may include confidential information that is not shared outside of the entity), that users in the operations department are authorized (e.g., because the operations department may be the only department that handles customer information), that users with the role of vice president or higher are authorized (e.g., because lower level roles do not handle confidential information), and that a particular person associated with user identifier 4567 is authorized (e.g., because the user that created the resource frequently emails presentation documents marked confidential to that person).

Based on determining the set of access rules, the access system may append the set of access rules to metadata of the resource. For example, the access system may update the metadata of the resource to include the set of access rules. In some implementations, the access system may generate information (e.g., in a database) that indicates an association between the set of rules and the resource.

As described herein, the set of rules determined by the access system may be updated by the access system in real time, periodically, or upon the occurrence of one or more events, in order to adapt to modifications to the resource and/or modifications to parameters for sharing the resource. For example, continuing with the example above, if the presentation document is modified to remove the text "highly confidential," then the machine learning model may determine an updated set of access rules for the resource. For example, the updated set of access rules may indicate that the resource is non-confidential but is still to be kept internal to the entity, or that users with the role of supervisor or higher are authorized. Thus, in some implementations, the access system may detect subsequent modification or subsequent sharing of the resource, and the access system may determine an updated set of rules for the resource based on the subsequent modification or the subsequent sharing, in a similar manner as described above.

In some implementations, the access system may modify a portion of the content of the resource based on determining the set of access rules. For example, the set of access rules may indicate that the resource is confidential, however, the content of the resource may lack an indication that the resource is confidential (e.g., in a header of a document). Continuing with the example, the access system may modify a portion of the content of the resource to insert text indicating that the resource is confidential. As another example, the set of access rules may indicate that the resource is for public distribution, however, the content of the resource may include sensitive information (e.g., confidential information or personally identifiable information). Continuing with the example, the access system may modify a portion of the content of the resource to delete the sensitive information or substitute the sensitive information with non-sensitive text. In some implementations, modifying a portion of the content of the resource may include inserting text into or deleting text from the content, inserting a watermark into or deleting a watermark from the content, and/or inserting an image into or deleting an image from the content. In some implementations, modifying a portion of the content of the resource may include generating a copy of the resource that includes the modified portion of the content and replacing the resource with the copy of the resource.

In some implementations, the access system may determine additional access rules for an additional resource of the computing system based on determining the access rules for the resource. In some implementations, the access system may determine a relationship between the resource and the additional resource (e.g., when the resource is accessed, the additional resource is also accessed), and based on determining the relationship, the access system may determine additional access rules for the additional resource based on the access rules for the resource. In some implementations, the access system may identify, in the content of the resource, a reference to an additional resource of the computing system. For example, the resource may include a link to the additional resource, may embed the additional resource, or may include a description of the additional resource. The access system, based on the reference to the additional resource in the resource, may determine additional access rules for the additional resource based on the access rules for the resource. Additional rules determined for an additional resource may be the same as the access rules for the resource or may be derived from (but different to) the access rules for the resource.

In some implementations, the access system may determine a recommendation of a set of users (e.g., one or more particular users, one or more groups of users, one or more departments, or the like) to have authorization to access the resource. For example, the access system may determine the recommendation based on the characteristics relating to the user and/or the characteristics relating to the resource. As an example, the set of users may be recommended if the user has historically shared resources of a similar type and/or content with the set of users, if the set of users are supervisors of the user, and/or if the content of the resource pertains to a role of the set of users. Based on determining the recommendation, the access system may transmit a notification indicating the recommendation to the user device associated with the user. For example, the notification may include an input element that enables the user to indicate acceptance of the recommendation. Moreover, the access system may receive, from the user device, an indication of whether the recommendation is accepted (e.g., the indication may be generated and transmitted to the access system using the input element). In some implementations, the set of access rules determined by the access system may be further based on whether the recommendation is accepted. For example, if the recommendation is accepted, the set of access rules may indicate that the set of users are authorized to access the resource. In some implementations, the access system may determine the recommendation based on detecting that the resource is being shared by the user (e.g., the resource has been attached to an email).

The access system may control access to the resource based on the set of access rules determined for the resource (which in some cases may be an updated set of rules, as described above). Controlling access to the resource may include permitting access attempts that adhere to the access rules and/or preventing access attempts that violate the access rules, as described herein. In a similar manner, the access system may also control access to the additional resource based on the additional set of access rules determined for the additional resource. In connection with controlling access to resources, the access system may monitor and detect attempts to access the resources. As used herein, "access" to a resource may include viewing the resource, modifying the resource, using the resource (e.g., if the resource is an application or a system), and/or sharing the resource.

Figure 1D:
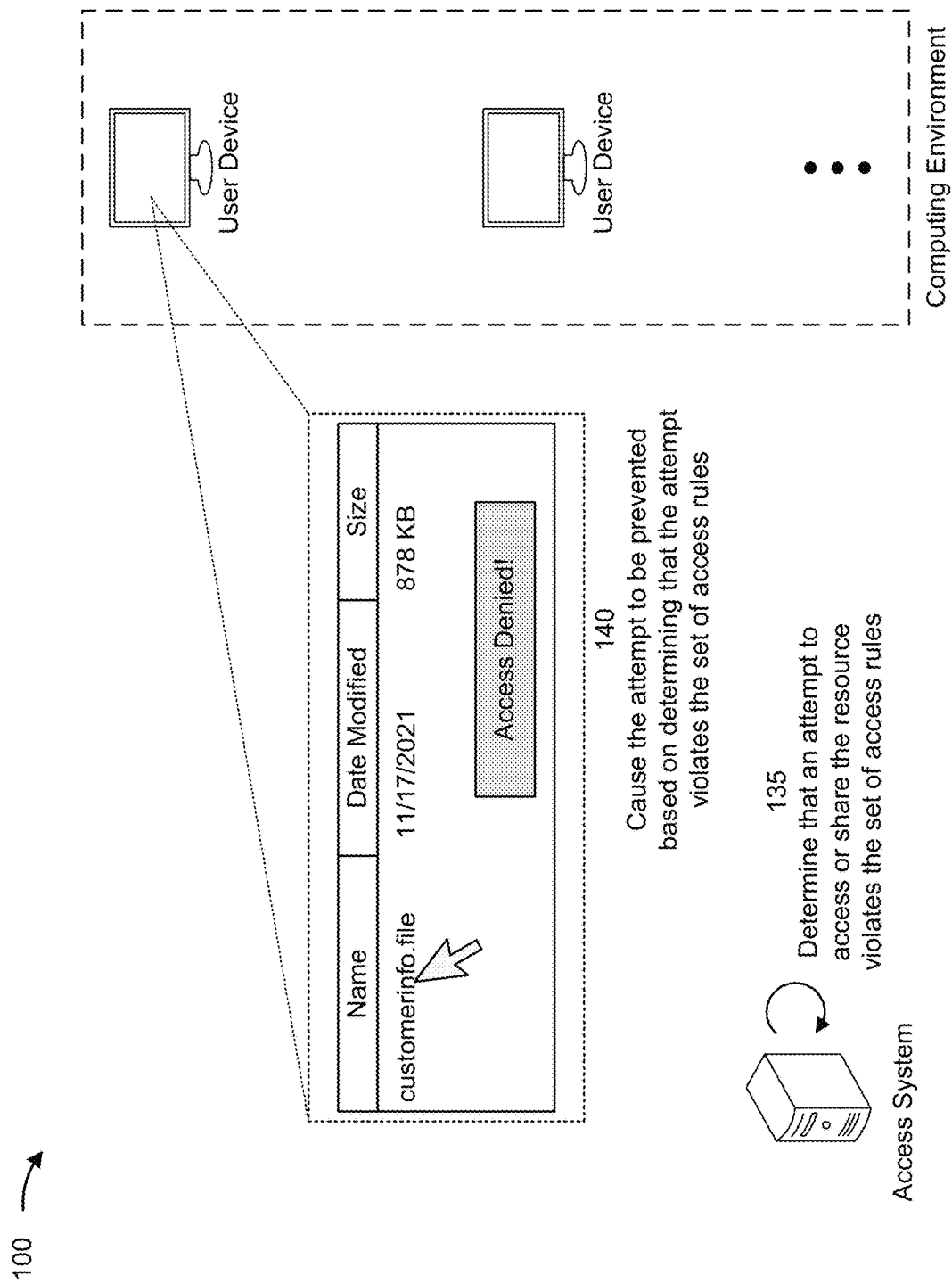

As shown in FIG. 1D, and by reference number 135, the access system may determine that an attempt to access the resource violates the set of access rules determined for the resource. In other cases, the access system may determine that the attempt does not violate the set of access rules. The attempt may include an operation performed by the user device (e.g., in connection with a profile of a different user) or an operation performed by another user device to view, modify, use, and/or share the resource.

In some implementations, the access system may determine that the attempt violates the set of access rules based on the metadata of the resource (e.g., to which the access rules were appended). For example, upon detecting the attempt to access the resource, the access system may read the metadata of the resource to determine whether the attempt violates the set of access rules. As an example of the attempt violating the set of access rules, the set of access rules may indicate that a finance department of the entity is authorized to access the resource, while the attempt may be an attempt to access the resource by a user in the legal department of the entity. As another example of the attempt violating the set of access rules, the set of access rules may indicate that the resource is to be kept internal to the entity, while the attempt may be an attempt to share the resource outside of the entity.

As shown by reference number 140, the access system may cause the attempt to be prevented based on determining that the attempt violates the set of access rules. Preventing the attempt may include denying access to the resource (e.g., preventing a user device from opening or viewing the resource), preventing modification of the resource (e.g., locking the resource in a read-only mode), preventing attachment of the resource to a communication (e.g., blocking the attachment of the resource or automatically removing the resource after attachment), and/or preventing transmission of a communication that has the resource attached (e.g., blocking the transmission of the communication or routing the communication to a queue for moderation or deletion).

In some implementations, based on determining that the attempt violates the set of access rules, the access system may transmit a notification to a user device associated with the attempt indicating that the attempt violates the set of access rules. The notification may be transmitted in connection with preventing the attempt. In some implementations, the notification may include an input element to enable access to the resource in violation of the set of access rules. In other words, the input element may enable overriding of the set of access rules. In some implementations, the notification may selectively include the input element based on a role associated with a user that is attempting to access the resource in violation of the set of access rules, such that only particular roles have the ability to override the set of access rules. For example, the notification may include the input element if the role is a first role (e.g., senior vice president) and the notification may omit the input element if the role is a second role (e.g., administrative assistant). Use of the input element by a user may cause a user device of the user to transmit a request to the access system to override the set of access rules (e.g., the request may indicate the user or the role of the user). Based on receiving the request, the access system may update (e.g., temporarily) the set of access rules in a manner that allows the attempt and/or the access system may refrain from enforcing the access rules with respect to the attempt.

In some implementations, where the set of access rules are appended to metadata of the resource, the access system may determine that the attempt is to result in the resource being shared outside of the computing system (e.g., the attempt is an attempt to share the resource outside of the computing system). Here, the access system may remove the set of access rules from the metadata of the resource prior to the resource being shared. For example, the access system may remove the set of access rules from the metadata of the resource upon detecting that the resource is being attached to a communication and/or upon detecting that the resource is already attached to a communication that is awaiting transmission.

The access system may generate and update a log relating to one or more resources. For example, the access system may update the log each time there is an attempt to access a resource and/or each time a set of access rules for a resource is updated. In some implementations, the access system may generate, in the log, an entry that indicates (e.g., by providing information relating to) a change from a previous set of access rules for the resource to the set of access rules for the resource (e.g., indicating which changes were made to the set of access rules), indicates a modification to the resource that caused the change from the previous set of access rules for the resource to the set of access rules for the resource (e.g., indicating the particular addition or deletion of text from the resource that caused the set of access rules to change), and/or indicates the attempt to access the resource that violates the set of access rules (e.g., indicating a user associated with the attempt, a user device associated with the attempt, and/or a type of access of the attempt).

The access system may determine that the log is indicative of behavior associated with malicious activity by one or more individuals. For example, the access system may determine that the log is indicative of the behavior using a machine learning model (e.g., the same machine learning model described above or an additional machine learning model). As an example, the machine learning model may be trained to output an indication of whether behavior is indicative of malicious activity based on characteristics of entries in the log (e.g., a time of one or more entries, a frequency of entries, users associated with one or more entries, or the like).

Based on determining that the log is indicative of the behavior, the access system may perform one or more actions. In some implementations, an action may include causing revocation of privileges of user devices, associated with the one or more individuals, to access resources of the computing system. Additionally, or alternatively, an action may include transmitting a notification to a user device associated with a supervisor of the one or more individuals. The notification may provide details relating to the behavior, such as identities of the one or more individuals and/or information relating to one or more resources targeted by the malicious activity. Additionally, or alternatively, an action may include transmitting a notification to one or more user devices associated with the one or more individuals. The notification may indicate that malicious activity by the one or more individuals is suspected. Additionally, or alternatively, an action may include generating a meeting event for a meeting between the individual(s) and a supervisor of the individual(s) and causing calendars of the individual(s) and the supervisor to be populated with the meeting event. Additionally, or alternatively, an action may include generating and transmitting a communication (e.g., an email) indicating that a previous communication from the individual(s) that shares a resource associated with the malicious activity is being recalled or is to be deleted by the recipient.

In some implementations, the access system may determine a characterization of data that is accessed by a particular set of users (e.g., by a particular department, by a particular team within a department, or by one or more particular users). Additionally, or alternatively, the access system may determine a characterization of data that is used by (e.g., stored by) a particular system (e.g., an email system, a document retention system, or a cloud storage system, among other examples). A characterization of data may indicate whether the data includes confidential information, personally-identifiable information, internal-only information, and/or financial information, among other examples. The access system may determine a characterization of data for the set of users or the system based on access rules for one or more resources associated with the set of users or the system, respectively. For example, to determine a characterization of data that is accessed by a finance department of the entity, the access system may identify resources associated with access rules that authorize access by the finance department (e.g., because such resources, or similar resources, have been historically accessed by users in the finance department), and determine the characterization of the data based on the access rules. As an example, the access rules may indicate authorization classifications for one or more resources indicating that the one or more resources are confidential or contain personally-identifiable information, among other examples, and the characterization of the data may indicate such classifications. In some implementations, the access system may generate a report that indicates one or more characterizations of data or may transmit a notification that indicates one or more characterizations of data.

In some implementations, the access system may determine a utilization rate (e.g., across users of the computing system) of an application (e.g., a software application) or a system of the computing system. The access system may determine the utilization rate based on access rules for one or more resources associated with the application or the system. For example, the access rules may indicate that only users in a legal department of the entity are authorized to access resources used by a particular application, and the legal department may account for a small percentage of overall users of the computing system (e.g., the utilization rate is low). The access system may determine a recommendation that the application or the system is to be eliminated or replaced if a utilization rate determined for the application or the system is below a threshold. In some implementations, the access system may generate a report that indicates one or more applications or systems that are recommended to be eliminated or replaced or may transmit a notification that indicates one or more applications or systems that are recommended to be eliminated or replaced. Additionally, or alternatively, the access system may automatically cause elimination of an application or a system that is recommended to be eliminated (e.g., by causing the application or the system to be uninstalled or by transmitting a request to cancel a subscription for the application or the system).

In this way, the access system may determine and apply access rules in a manner that is dynamic and that can be updated in real time or near-real time as a resource, or the use thereof, changes, thereby providing improved computing security. Moreover, access rules determined by the access system have improved precision such that computing resources that would otherwise be expended as a result of overly restrictive or overly permissive access rules are conserved. Furthermore, the access system facilitates fast detection and prevention of malicious activity, thereby conserving computing resources that would otherwise be expended monitoring for, detecting, and remediating malicious activity.

As indicated above, FIGS. 1A-1D are provided as an example. Other examples may differ from what is described with regard to FIGS. 1A-1D.

Figure 2:
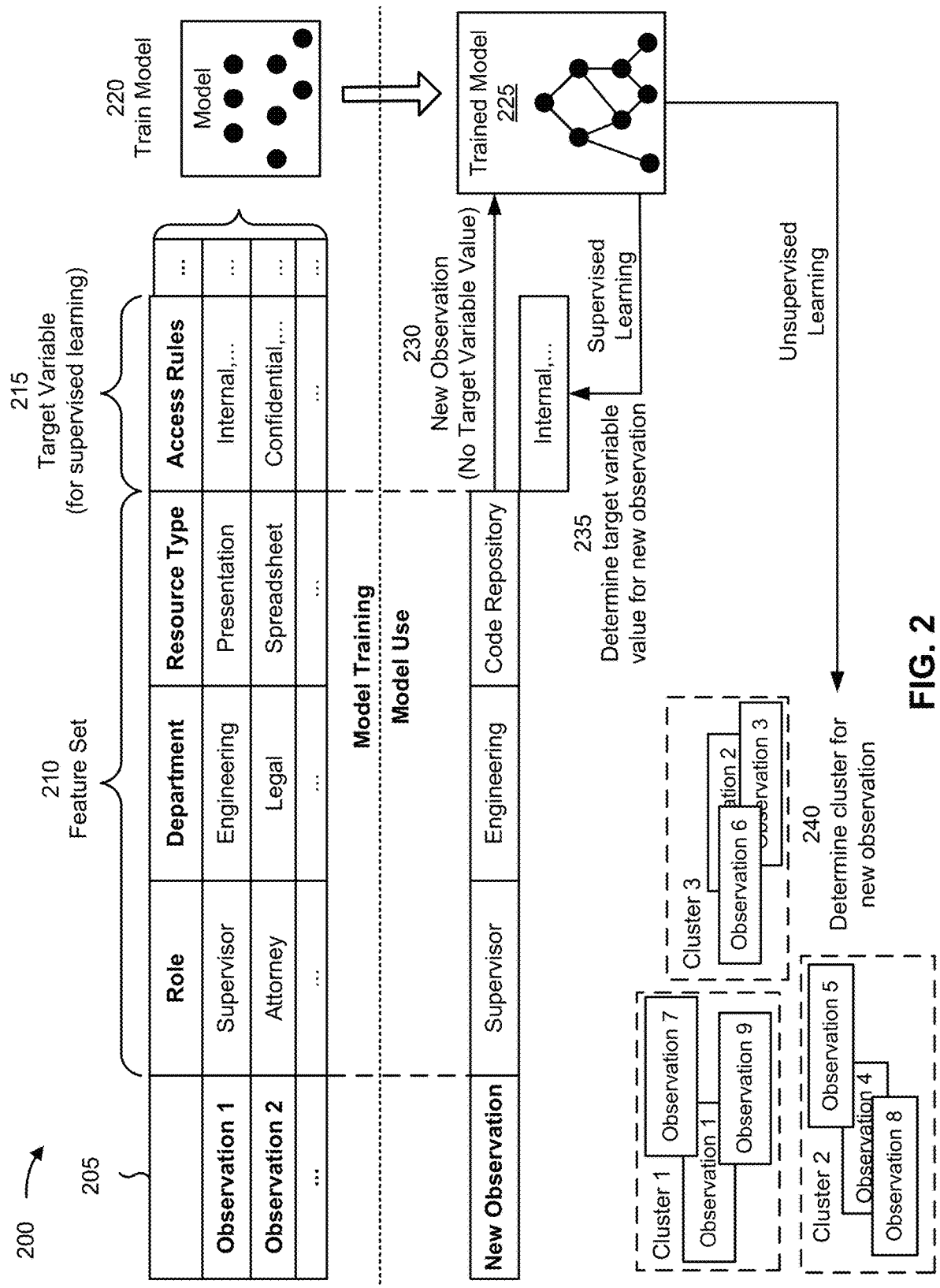
FIG. 2 is a diagram illustrating an example of training and using a machine learning model in connection with resource access control, in accordance with some embodiments of the present disclosure.

FIG. 2 is a diagram illustrating an example 200 of training and using a machine learning model in connection with resource access control. The machine learning model training and usage described herein may be performed using a machine learning system. The machine learning system may include or may be included in a computing device, a server, a cloud computing environment, or the like, such as the access system and/or the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the storage system, the resources system, and/or the communications system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the storage system, the resources system, and/or the communications system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of role, a second feature of department, a third feature of resource type, and so on. As shown, for a first observation, the first feature may have a value of supervisor, the second feature may have a value of engineering, the third feature may have a value of presentation, and so on. These features and feature values are provided as examples, and may differ in other examples. For example, the feature set may include one or more of the following features: a role of a user that is creating, modifying, or sharing a resource, a role of a user that previously created a resource, a role of a user that previously shared a resource, a user group to which a user belongs, a department to which a user belongs, one or more characteristics associated with a resource (e.g., a content of the resource and/or access rules for the resource) previously created, modified, or shared by a user, one or more characteristics associated with a communication previously received or transmitted by a user (e.g., a content of the communication, one or more attachments to the communication, a recipient of the communication, and/or a sender of the communication), one or more recipients with which a user previously shared a resource, access permissions of a user with respect to one or more data files, access permissions of a user with respect to one or more directories, access permissions of a user with respect to one or more applications or systems, a content of a resource, a type of a resource, an application used to create, modify, or share a resource, a location at which a resource resides, and/or one or more recipients with which a resource is being shared, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is access rules, which has a value of internal, etc. for the first observation.

The feature set and target variable described above are provided as examples, and other examples may differ from what is described above. For example, for a target variable of whether behavior is indicative of malicious activity, the feature set may include a change to a set of access rules of a resource, a modification to a resource resulting in a change of access rules for the resource, a frequency of attempts to access a resource in violation of a set of access rules for the resource, a time of day of an attempt to access a resource in violation of a set of access rules, whether a user has requested to override a set of access rules for a resource, and/or a quantity of times that a set of access rules for a resource have been overridden, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) a set of access rules for a resource based on an input (e.g., at an input layer) indicating characteristics relating to the resource and/or characteristics relating to a user that created, modified, and/or shared the resource, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing role, a second node representing department, a third node representing resource type, and so forth. Nodes in the output layer may represent outputs of the machine learning model, such as a first node indicating whether a resource is for internal or external use, a second node indicating whether a resource is confidential or non-confidential, a third node indicating a department that should have access to a resource, and so forth. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on data relating to resources of an entity, such as documents, repositories, applications, or the like. The data may indicate a content of the resources, information relating to users that have accessed the resources, information relating to recipients with which the resources have been shared, information indicating systems or applications used to create, modify, or share the resources, information indicating types of the resources, and/or information indicating file locations of the resources, among other examples. In some implementations, the data may also indicate which resources have been associated with an investigation of malicious activity and/or which users have been associated with an investigation of malicious activity. The data may be obtained by extracting data and metadata from the resources and logging user activity relating to the resources.

As shown by reference number 230, the machine learning system may apply the trained machine learning model 225 to a new observation, such as by receiving a new observation and inputting the new observation to the trained machine learning model 225. As shown, the new observation may include a first feature value of supervisor, a second feature value of engineering, a third feature value of code repository, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of internal, etc. for the target variable of access rules for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a set of users that are to be authorized to access a resource, as described above. The first automated action may include, for example, modifying a portion of a content of a resource, as described above.

As another example, if the machine learning system were to predict a value of confidential, etc. for the target variable of access rules, then the machine learning system may provide a second (e.g., different) recommendation (e.g., a recommendation of a different set of users authorized to access the resource) and/or may perform or cause performance of a second (e.g., different) automated action (e.g., modify a different portion of the content of the resource and/or differently modify the portion of the content of the resource).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., internal access), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., confidential), then the machine learning system may provide a second (e.g., different) recommendation and/or may perform or cause performance of a second (e.g., different) automated action, in a similar manner as described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. For example, the recommendations associated with determining whether behavior is indicative of malicious activity may include a recommendation to revoke the privileges of one or more individuals to access resources, a recommendation to notify a supervisor of one or more individuals, or the like. The actions associated with determining whether behavior is indicative of malicious activity may include, for example, causing privileges of one or more individuals to access resources to be revoked, transmitting a notification to a supervisor, or the like. The clusters associated with determining whether behavior is indicative of malicious activity may include, for example, malicious activity indicated, no malicious activity indicated, or malicious activity potentially indicated.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include sets of access rules determined for resources.

In this way, the machine learning system may apply a rigorous and automated process to determine access rules and/or identify malicious activity. The machine learning system enables recognition and/or identification of tens, hundreds, thousands, or millions of features and/or feature values for tens, hundreds, thousands, or millions of observations, thereby increasing accuracy and consistency and reducing delay associated with determining access rules and/or identifying malicious activity relative to requiring computing resources to be allocated for tens, hundreds, or thousands of operators to manually determine access rules and/or identify malicious activity using the features or feature values.

As indicated above, FIG. 2 is provided as an example. Other examples may differ from what is described in connection with FIG. 2.

Figure 3:
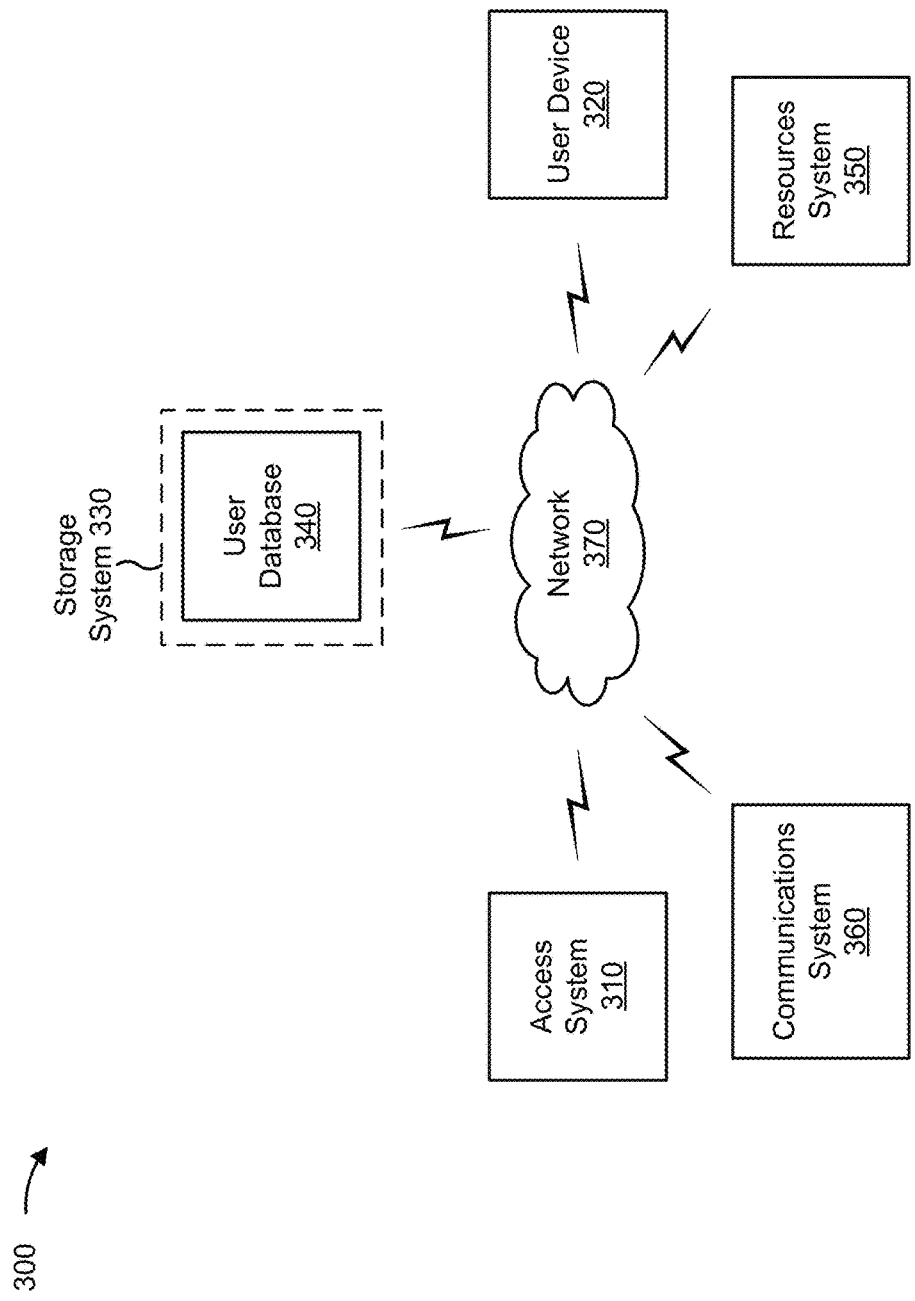
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an access system 310, a user device 320, a storage system 330 (e.g., that includes a user database 340), a resources system 350, a communications system 360, and a network 370. Devices of environment 300 may interconnect via wired connections, wireless connections, or a combination of wired and wireless connections.

The access system 310 includes one or more devices capable of receiving, generating, storing, processing, providing, and/or routing information associated with resource access control, as described elsewhere herein. The access system 310 may include a communication device and/or a computing device. For example, the access system 310 may include a server, such as an application server, a client server, a web server, a database server, a host server, a proxy server, a virtual server (e.g., executing on computing hardware), or a server in a cloud computing system. In some implementations, the access system 310 includes computing hardware used in a cloud computing environment.

The user device 320 includes one or more devices capable of receiving, generating, storing, processing, and/or providing information associated with resource access control, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The storage system 330 includes one or more devices capable of receiving, generating, storing, processing, and/or providing information associated with resource access control, as described elsewhere herein. The storage system 330 may include a communication device and/or a computing device. For example, the storage system 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 330 may include the user database 340.

The resources system 350 includes one or more devices capable of receiving, generating, storing, processing, and/or providing information associated with resources for which access is to be controlled, as described elsewhere herein. The resources system 350 may include a communication device and/or a computing device. For example, the resources system 350 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the resources system 350 may store resources, or information relating thereto, for which access is to be controlled, as described elsewhere herein.

The communications system 360 includes one or more devices capable of receiving, generating, storing, processing, and/or providing information associated with communications that are transmitted or received, as described elsewhere herein. The communications system 360 may include a communication device and/or a computing device. For example, the communications system 360 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the communications system 360 may store communications, or information relating thereto, that are transmitted or received by users, as described elsewhere herein.

The network 370 includes one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
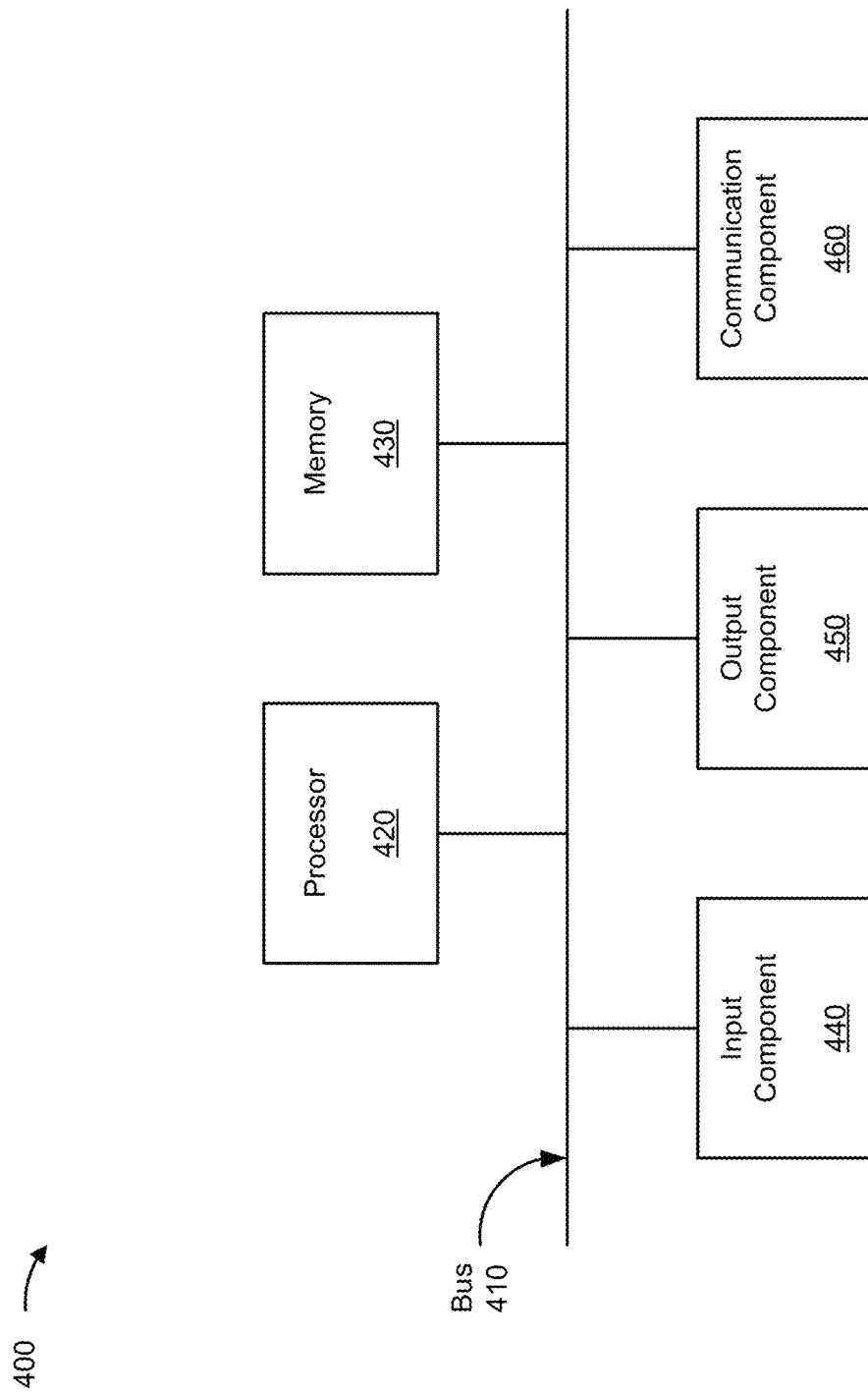
FIG. 4 is a diagram of example components of one or more devices of FIG. 2, in accordance with some embodiments of the present disclosure.

FIG. 4 is a diagram of example components of a device 400 associated with resource access control. Device 400 may correspond to access system 310, user device 320, storage system 330, resources system 350, and/or communications system 360. In some implementations, access system 310, user device 320, storage system 330, resources system 350, and/or communications system 360 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
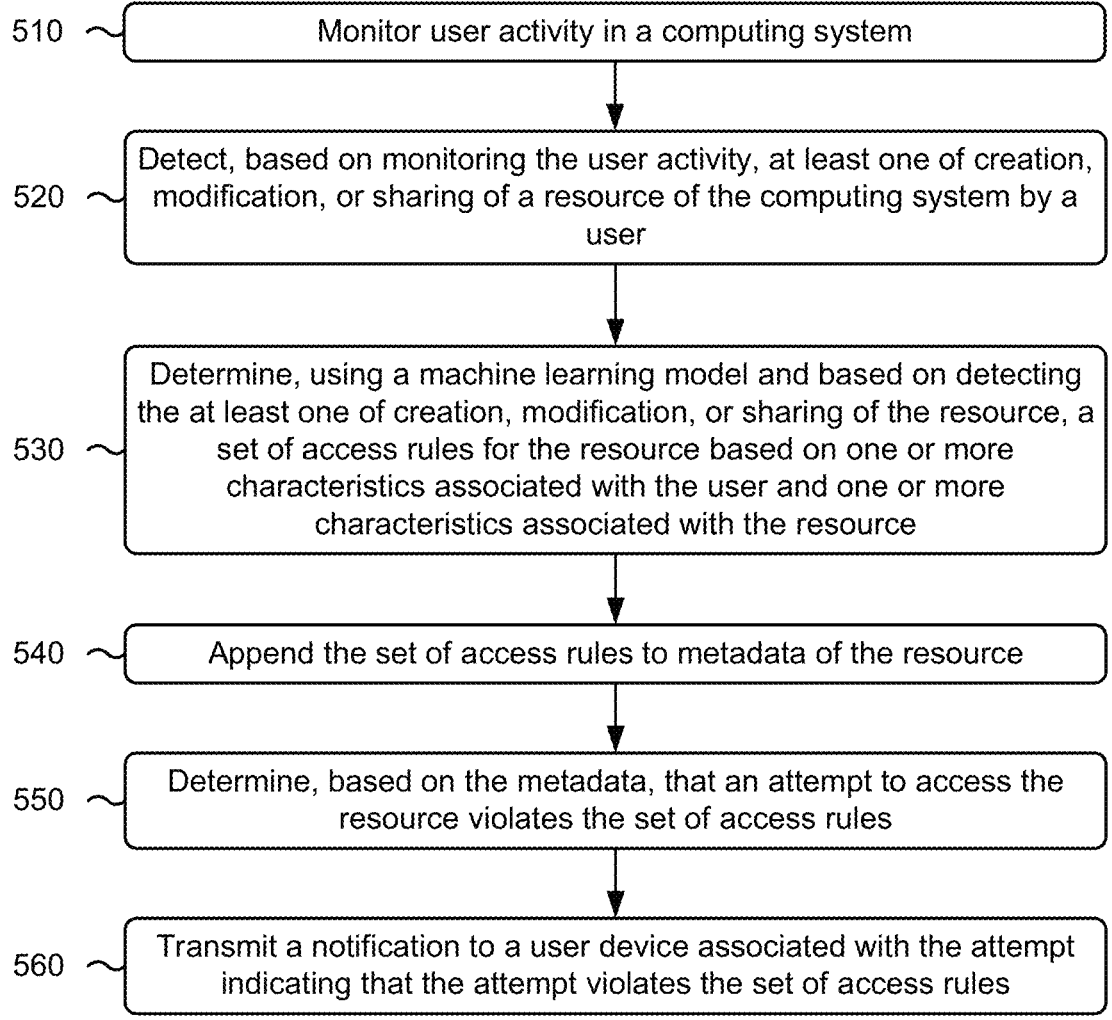
FIG. 5 is a flowchart of an example process relating to resource access control, in accordance with some embodiments of the present disclosure.

FIG. 5 is a flowchart of an example process 500 associated with resource access control. In some implementations, one or more process blocks of FIG. 5 may be performed by the access system 310. In some implementations, one or more process blocks of FIG. 5 may be performed by another device or a group of devices separate from or including the access system 310, such as the user device 320, the storage system 330, the resources system 350, and/or the communications system 360. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include monitoring user activity in a computing system (block 510). For example, the access system 310 (e.g., using processor 420 and/or memory 430) may monitor user activity in a computing system, as described above in connection with reference number 105 of FIG. 1A. As an example, the access system 310 may monitor for user activity relating to creation, modification, or sharing of a resource of the computing system.

As further shown in FIG. 5, process 500 may include detecting, based on monitoring the user activity, at least one of creation, modification, or sharing of a resource of the computing system by a user (block 520). For example, the access system 310 (e.g., using processor 420 and/or memory 430) may detect, based on monitoring the user activity, at least one of creation, modification, or sharing of a resource of the computing system by a user, as described above in connection with reference number 110 of FIG. 1A. As an example, detecting that the user is creating, modifying, and/or sharing the resource may cause (e.g., trigger) the access system 310 to generate or update access rules for the resource.

As further shown in FIG. 5, process 500 may include determining, using a machine learning model and based on detecting the at least one of creation, modification, or sharing of the resource, a set of access rules for the resource based on one or more characteristics associated with the user and one or more characteristics associated with the resource (block 530). For example, the access system 310 (e.g., using processor 420 and/or memory 430) may determine, using a machine learning model and based on detecting the at least one of creation, modification, or sharing of the resource, a set of access rules for the resource based on one or more characteristics associated with the user and one or more characteristics associated with the resource, as described above in connection with reference number 130 of FIG. 1C. As an example, an input to the machine learning model may indicate that the user that created the resource is a vice president in an operations department and the resource is a presentation document with content that includes the text "customer information" and "highly confidential." Continuing with the example, the machine learning model may determine the set of access rules indicating that the resource is confidential and is to be kept internal to the entity, that users in the operations department are authorized, that users with the role of vice president or higher are authorized, and that one or more particular people are authorized. In some implementations, the one or more characteristics associated with the user include at least a role of the user, and the one or more characteristics associated with the resource include at least a content of the resource. In some implementations, the set of access rules indicate at least a set of users authorized to access the resource.

As further shown in FIG. 5, process 500 may include appending the set of access rules to metadata of the resource (block 540). For example, the access system 310 (e.g., using processor 420 and/or memory 430) may append the set of access rules to metadata of the resource, as described above in connection with reference number 130 of FIG. 1C. As an example, the access system 310 may update the metadata of the resource to include the set of access rules.

As further shown in FIG. 5, process 500 may include determining, based on the metadata, that an attempt to access the resource violates the set of access rules (block 550). For example, the access system 310 (e.g., using processor 420 and/or memory 430) may determine, based on the metadata, that an attempt to access the resource violates the set of access rules, as described above in connection with reference number 135 of FIG. 1D. As an example, the access system 310 may determine that a user in the legal department is attempted to attach the resource to an email (whereas the set of rules indicate that only users in the operations department are authorized to access the resource).

As further shown in FIG. 5, process 500 may include transmitting a notification to a user device associated with the attempt indicating that the attempt violates the set of access rules (block 560). For example, the access system 310 (e.g., using processor 420, memory 430, and/or communication component 460) may transmit a notification to a user device associated with the attempt indicating that the attempt violates the set of access rules, as described above in connection with reference number 140 of FIG. 1D. As an example, the notification may indicate that the attempt was prevented and/or the notification may include an input element to enable access to the resource in violation of the set of access rules.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for resource access control, the system comprising:
   one or more memories; and
   one or more processors, communicatively coupled to the one or more memories, configured to:
      monitor user activity in a computing system;
      detect, based on monitoring the user activity, at least one of creation, modification, or sharing of a resource of the computing system by a user;
      determine, using a machine learning model and based on detecting the at least one of creation, modification, or sharing of the resource, a set of access rules for the resource based on one or more characteristics associated with the user and one or more characteristics associated with the resource,
         wherein the one or more characteristics associated with the user include at least a role of the user,
         wherein the one or more characteristics associated with the resource include at least a content of the resource, and
         wherein the set of access rules indicate at least a set of users authorized to access the resource;
      append the set of access rules to metadata of the resource;
      determine, based on the metadata, that an attempt to access the resource violates the set of access rules; and
      transmit a notification to a user device associated with the attempt indicating that the attempt violates the set of access rules.

2. The system of claim 1, wherein the notification includes an input element to enable access to the resource in violation of the set of access rules.

3. The system of claim 1, wherein the one or more processors are further configured to:
   generate, in a log, an entry that indicates at least one of:
      a change from a previous set of access rules for the resource to the set of access rules,
      a modification to the resource that caused a change from a previous set of access rules for the resource to the set of access rules, or
      the attempt to access the resource that violates the set of access rules.

4. The system of claim 3, wherein the one or more processors are further configured to:
   determine, using an additional machine learning model, that the log is indicative of behavior associated with malicious activity by one or more individuals; and
   perform one or more actions based on determining that the log is indicative of the behavior, the one or more actions including at least one of:
      causing revocation of privileges of user devices associated with the one or more individuals to access resources of the computing system, or
      transmitting a notification to a user device associated with a supervisor of the one or more individuals.

5. The system of claim 1, where the one or more characteristics associated with the user further include one or more of:
   a user group to which the user belongs,
   a department to which the user belongs,
   characteristics associated with one or more resources previously created, modified, or shared by the user,
   one or more recipients with which the user previously shared one or more resources, or
   characteristics of communications received or transmitted by the user.

6. The system of claim 1, wherein the one or more characteristics associated with the resource further include one or more of:
   an application used to create, modify, or share the resource,
   a location at which the resource resides, or
   one or more recipients with which the resource is being shared.

7. The system of claim 1, wherein the one or more processors are further configured to:

modify a portion of the content of the resource based on the set of access rules that are determined.

8. The system of claim 1, wherein the resource is an electronic document or an electronic repository.

9. A method of resource access control, comprising:
monitoring, by a device, user activity in a computing system;
detecting, by the device and based on monitoring the user activity, modification of a resource of the computing system by a user;
determining, by the device using a machine learning model and based on detecting the modification of the resource, a set of access rules for the resource based on one or more characteristics associated with the user and one or more characteristics associated with the resource,
wherein the one or more characteristics associated with the user include at least a role of the user,
wherein the one or more characteristics associated with the resource include at least a content of the resource, and
wherein the set of access rules indicate at least a set of users authorized to access the resource;
identifying, by the device in the content of the resource, a reference to an additional resource of the computing system;
determining, by the device, an additional set of access rules for the additional resource based on the set of access rules; and
controlling, by the device, access to the resource based on the set of access rules and to the additional resource based on the additional set of access rules.

10. The method of claim 9, wherein controlling access to the resource comprises:
determining that an attempt to access the resource violates the set of access rules; and
causing the attempt to be prevented based on determining that the attempt violates the set of access rules.

11. The method of claim 9, further comprising:
determining, based on at least one of the one or more characteristics associated with the user or the one or more characteristics associated with the resource, a recommendation of a set of users to have authorization to access the resource;
transmitting a notification indicating the recommendation to a user device associated with the user; and
receiving, from the user device, an indication of whether the recommendation is accepted,
wherein the set of access rules are to be determined further based on whether the recommendation is accepted.

12. The method of claim 9, wherein the set of access rules indicates at least one of:
one or more departments authorized to access the resource,
one or more roles authorized to access the resource,
one or more groups of users authorized to access the resource,
one or more particular people authorized to access the resource, or
one or more authorization classifications for the resource.

13. The method of claim 9, further comprising:
generating, in a log, an entry that indicates at least one of:
a change from a previous set of access rules for the resource to the set of access rules,
the modification to the resource that caused a change from a previous set of access rules for the resource to the set of access rules, or
an attempt to access the resource that violates the set of access rules.

14. The method of claim 13, further comprising:
determining, using an additional machine learning model, that the log is indicative of behavior associated with malicious activity by one or more individuals; and
performing one or more actions based on determining that the log is indicative of the behavior, the one or more actions including at least one of:
causing revocation of privileges of the one or more individuals to access resources of the computing system, or
transmitting a notification to a user device associated with a supervisor of the one or more individuals.

15. A non-transitory computer-readable medium storing a set of instructions for resource access control, the set of instructions comprising:
one or more instructions that, when executed by one or more processors of a device, cause the device to:
monitor user activity in a computing system;
detect, based on monitoring the user activity, at least one of creation, modification, or sharing of a resource of the computing system by a user;
determine, using a machine learning model and based on detecting the at least one of creation, modification, or sharing of the resource, a set of access rules for the resource based on one or more characteristics associated with the user and one or more characteristics associated with the resource;
determine an additional set of access rules for an additional resource of the computing system; and
control access to the resource based on the set of access rules and to the additional resource based on the additional set of access rules.

16. The non-transitory computer-readable medium of claim 15, wherein the one or more instructions, when executed by the one or more processors, further cause the device to:
detect subsequent modification of the resource; and
determine an updated set of rules for the resource based on the subsequent modification,
wherein access to the resource is controlled based on the updated set of rules.

17. The non-transitory computer-readable medium of claim 15, wherein the one or more instructions, that cause the device to control access to the resource, cause the device to:
determine that an attempt to access the resource violates the set of access rules; and
transmit a notification to a user device associated with the attempt indicating that the attempt violates the set of access rules.

18. The non-transitory computer-readable medium of claim 15, wherein the one or more instructions, when executed by the one or more processors, further cause the device to:
append the set of access rules to metadata of the resource;
determine that an attempt to access the resource is to result in the resource being shared outside of the computing system; and
remove the set of access rules from the metadata of the resource prior to the resource being shared.

19. The non-transitory computer-readable medium of claim 15, wherein the one or more instructions, when executed by the one or more processors, further cause the device to:
   identify, in a content of the resource, a reference to the additional resource.

20. The non-transitory computer-readable medium of claim 15, wherein the one or more instructions, when executed by the one or more processors, further cause the device to:
   determine, based on at least one of the one or more characteristics associated with the user or the one or more characteristics associated with the resource, a recommendation of a set of users to have authorization to access the resource; and
   transmit a notification indicating the recommendation to a user device associated with the user.

* * * * *